June 1, 1926.
A. KREIN
1,586,903
SHOCK ABSORBER
Original Filed April 25, 1922
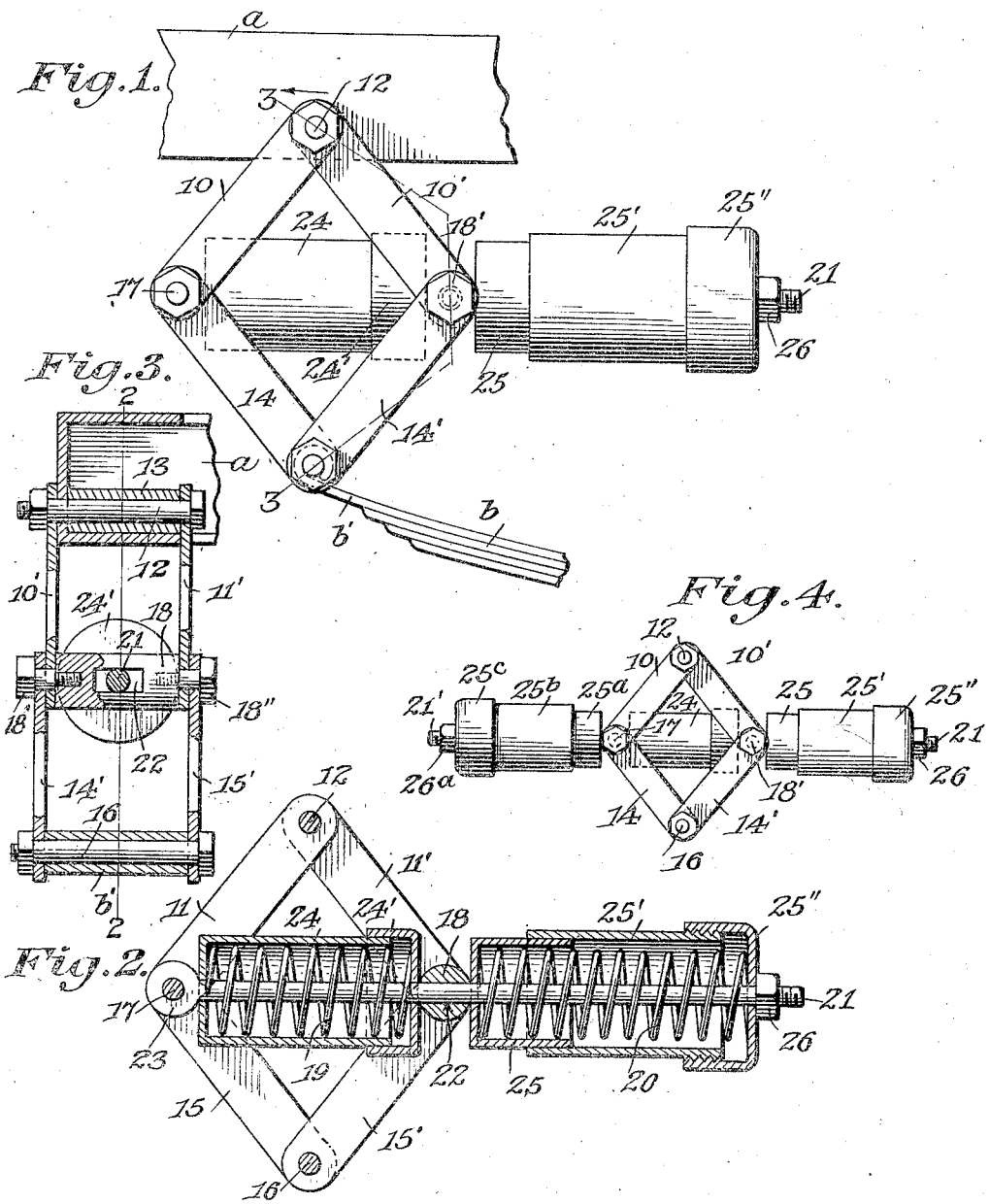
A. Krein, INVENTOR.
BY Geo. P. Kimmel, ATTORNEY.

Patented June 1, 1926.

1,586,903

UNITED STATES PATENT OFFICE.

ANDY KREIN, OF LANGDON, NORTH DAKOTA.

SHOCK ABSORBER.

Refile of abandoned application Serial No. 556,408, filed April 25, 1922. This application filed March 8, 1926. Serial No. 93,346.

This invention appertains to certain improvements in shock absorbers, and more particularly to a type of the same adapted for use on motor vehicles or the like for co-operation with the ordinary spring suspension or support of the body of the vehicle and in a manner designed to greatly improve the riding qualities thereof.

The principal object of the invention is to provide a shock absorber of the class mentioned, and one of a simple, durable and efficient construction and arrangement of parts designed to be interposed directly between the chassis side bars and the suspension or supporting springs, and, preferably in lieu of the usual shackles pivotally connecting the ends of the latter to the said chassis side bars. This application is a refile of former application Number 556,408 filed April 25, 1922.

With the foregoing and other objects in view, the invention resides in the certain new and useful construction and arrangement of parts as will be hereinafter more fully described, set forth in the appended claims, and illustrated in the accompanying drawing, in which:—

Figure 1 is a side elevation of a preferred embodiment of the device, and showing an application of the same between the inner end of a vehicle spring and a chassis or running gear side bar.

Figure 2 is a vertical longitudinal section taken on the line 2—2 of Figure 3.

Figure 3 is a vertical section taken on the line 3—3 of Figure 1, and

Figure 4 is a vertical side elevation of a slightly modified form of the same.

Referring to the drawing, wherein similar characters of reference indicate corresponding parts throughout the several views thereof, and more particularly to Figures 1 to 3 thereof, the reference character $a$ indicates one of the side bars or sills of the chassis or running gear of a motor vehicle or the like, and $b$ one of the semielliptical suspension or supporting springs therefor, the same being of the usual construction and arrangement as commonly employed in vehicles, especially of the automobile and motor vehicle types thereof.

In the usual method of attachment of the end of the spring $b$ to the side bar $a$, a form of shackle (not shown), is used, but in the present invention, a form of toggle is substituted for the shackle, and this toggle comprises pairs of upper levers 10, 10', and 11, 11', one pair disposed at each side of the side bar $a$ and commonly pivoted at one of their ends on the opposite ends of a bolt or the like 12 passed through the side bar $a$ for the purpose, a sleeve 13 being fitted onto the bolt 12 and interposed between the parts to maintain the lever ends in properly spaced and efficient operative positions thereon, and pairs of lower levers 14, 14', and 15, 15', commonly pivoted at their lower ends on the opposite ends of a bolt or the like 16 passed through the looped end $b'$ of the spring $b$, the other ends of both of the upper and lower pairs of levers being pivotally connected to pivots or the like 17 and 18, substantially as shown.

The shock absorbing qualities of this form of leverage connection between the side bar $a$ and the spring $b$ is to be effected by compression springs 19 and 20, the spring 19 being interposed in the horizontal plane of and between the pivots 17 and 18, and the spring 20 in the same plane and in alinement with the pivots 17 and 18 and the spring 19 at one side of the pivot 18, and exteriorly of the leverage connection. These springs 19 and 20 are positioned on a rod 21, which is extended horizontally inward of a slotted opening 22 formed medially of the pivot 18, and has its inner end formed to provide an eye 23 engaged on the pivot bolt 17. The spring 19 is preferably housed within a collapsible or telescopic casing formed of two cylindrical parts 24, 24', while the spring 20 is similarly housed within a casing formed of an inner part 25, an intermediate part 25' slidably engaged on the part 25, and an outer part 25'' which engages over the outer end of the spring 20 and is threaded onto the outer end of the intermediate part 25', substantially as shown. The extreme outer end of the rod 21 is threaded to receive thereon a nut 26, which may be adjusted to vary the tension of the springs 19 and 20 as may be desired or necessary from time to time. The pivot 18 is preferably in the form of a cylindrical body, having the slotted opening 22 extending therethrough medially of its opposite ends, and is of a length to space the pivoted ends of the levers apart, while the ends of the latter are connected thereto by means of shouldered screws 18' and 18'', in a manner as to not cause any binding action between the lever ends and the opposite ends of the body or pivot 18.

As shown in Figure 4, the rod 21 is extended through slotted openings formed in both pivots 17 and 18 to receive on its oppositely projected end 21′, a second outer spring housed within a casing formed of parts 25ª, 25ᵇ and 25ᶜ, corresponding to the casing parts 25, 25′ and 25″, on the oppositely projected end of the rod 21, and this end 21′ of the rod 21 is threaded to receive thereon a second adjusting nut 26ª, whereby the tension of the several springs may be varied or adjusted from the opposite ends of the rod 21.

In the operation of the device, in the event of a wheel of the vehicle on which a set of the devices have been installed, strikes an obstruction or the like, in the roadway, the vibration caused by the shock will be taken up on the main springs $b$ of the vehicle and transmitted therefrom to the compression springs 19 and 20 of the device, and will not otherwise be transmitted to the body of the vehicle. Upon the upward movement of the axle of the vehicle, immediately upon the striking of an obstruction by its wheels, the toggle connection or levers will act to compress the outer spring or springs 20, while on the rebounding movement of the main spring $b$ and the axle, the downward pull on the toggle connection or levers will act to place the inner spring 19 under compression, so that all shocks are absorbed or equalized by the device or devices, and all rebound or vertical movement of the body of the vehicle, caused by the sudden vertical movement of the wheels or axles thereof, is prevented. The collapsible or telescopic formation on the casings 24 and 25, enclosing the springs 19 and 20, allow for the free expansion and compression of the latter, and at the same time keep the same free from injurious effects of dust, mud and weather.

In certain makes of cars, there possibly would not be sufficient room or space for the attaching of the shock absorbers between the extreme ends of the springs and the chassis side bars, in which case, one or more of the devices would be interposed between an intermediate portion of a spring and its complemental side bar, and preferably a pair of the same being so arranged and as close to the opposite ends of the spring as the space between the latter and the side bar will permit.

It is well understood that, while a preferred embodiment of the device has been described and illustrated herein in specific terms and details of construction, arrangement and operation, various changes in and modifications of the same may be resorted to without departing from the spirit of the invention, or the scope of the claims appended hereto.

Having thus fully described the invention, what is claimed as new is:—

1. A shock absorber comprising two pair of upper oppositely extending toggle levers pivotally connected together at their upper ends and adapted to have their pivoted ends connected to the body of a vehicle, two pair of lower oppositely extending toggle levers pivotally connected together at their lower ends and adapted to have their pivoted ends connected to one end of a vehicle spring, the levers of the upper pairs being oppositely disposed with respect to the levers of the lower pairs, a pair of pivots connecting the upper ends of the lower levers to the lower ends of the upper levers, one of said pivots provided with a rectangular slot, a rod extending through said slotted pivot and connected to the other pivot, a pair of telescopic casings slidably mounted on said rod and constituting abutments, one of said casings arranged between said pairs of levers and interposed between said pivots and having the movement of its sections controlled by said pivots, an abutment on one end of said rod, the other of said casings interposed between and having the movement of its sections controlled by said slotted pivot and said abutment, and a pair of cushioning springs mounted on said rod and each confined within a casing and constituting in connection with said casings shock absorbing means.

2. A shock absorber comprising a pair of telescopic casings positioned in lengthwise alignment and spaced from each other and each constituting an abutment, a pivot member arranged between and abutting against the opposed ends of said casings and provided with a rectangular slot, a rod having said casings slidably mounted thereon and further extending through said slot, an expansible member confined within each of said casings and surrounding said rod, a pivot member having one end of said rod connected therewith, an adjustable abutment on the other end of said rod, said pivot members and said abutment controlling the movement of the sections of said casings, and two oppositely disposed pair of toggles, the toggles of each pair being pivotally connected together and further pivotally mounted on said members and one pair adapted to be connected with the vehicle body and the other pair with the vehicle spring.

3. A shock absorber comprising a pair of telescopic sectional casings positioned in lengthwise alignment and spaced from each other, a pivot member arranged between and abutting against the opposed ends of said casings, a rod extending through said casings and said member, said casings constituting abutments, an expansible member confined within and having its movement controlled by each of said casings and further surrounding said rod, a pivot member having said rod connected therewith, an adjustable abutment mounted on said rod for one of said casings, and two pair of upper and two pair of lower toggles pivotally mounted on said members and adapted to be connected with a vehicle body and with a vehicle spring, and one of said casings positioned between said abutment and that member through which said rod extends, and the other of said casings shiftably positioned between said levers and further interposed between said pivot members.

In testimony whereof, I affix my signature hereto.

ANDY KREIN.